US007364402B2

(12) United States Patent
Brault et al.

(10) Patent No.: US 7,364,402 B2
(45) Date of Patent: Apr. 29, 2008

(54) TURBINE MODULE FOR A GAS TURBINE ENGINE

(75) Inventors: Michel Gilbert Roland Brault, Boussy Saint-Antoine (FR); Maurice Guy Judet, Dammarie les Lys (FR); Thomas Langevin, Dammarie les Lys (FR); Patrick Claude Pasquis, Moisenay (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/412,995

(22) Filed: Apr. 28, 2006

(65) Prior Publication Data

US 2007/0059164 A1 Mar. 15, 2007

(30) Foreign Application Priority Data

Apr. 29, 2005 (FR) .................................. 05 51124

(51) Int. Cl.
*F01D 5/04* (2006.01)
*F02C 7/20* (2006.01)
*F02C 7/36* (2006.01)

(52) U.S. Cl. ....................................... 415/174.5; 415/9

(58) Field of Classification Search .................... 415/9, 415/174.5, 199.5
See application file for complete search history.

(56) References Cited

U.S. PATENT DOCUMENTS

| | | | | |
|---|---|---|---|---|
| 5,816,776 | A | 10/1998 | Chambon et al. | |
| 6,893,222 | B2 * | 5/2005 | Allam | 416/144 |
| 7,210,909 | B2 * | 5/2007 | Escure et al. | 416/198 A |

FOREIGN PATENT DOCUMENTS

| | | |
|---|---|---|
| EP | 0 541 250 A1 | 5/1993 |
| EP | 0 718 469 A1 | 6/1996 |
| FR | 2 857 419 | 1/2005 |

* cited by examiner

*Primary Examiner*—Edward K. Look
*Assistant Examiner*—Nathan Wiehe
(74) *Attorney, Agent, or Firm*—Oblon, Spivak, McClelland, Maier & Neustadt, P.C.

(57) ABSTRACT

A turbine module for a gas turbine engine includes at least one turbine disk and a disk-shaped component mounted on the turbine disk upstream relative to the gas flow. The module can be assembled to the compressor of the engine, wherein the component is preassembled to the turbine disk, before the module is assembled to the compressor, by bolting to an attachment flange fixedly attached to the turbine disk.

15 Claims, 3 Drawing Sheets

TURBINE MODULE FOR A GAS TURBINE ENGINE

The present invention relates to the field of gas turbine engines and is aimed in particular at a turbine module, particularly the high pressure module.

BACKGROUND OF THE INVENTION

An axial-flow gas turbine engine comprises a rotary assembly forming a compressor, feeding a fixed combustion chamber which itself delivers hot gases to a rotary assembly forming a turbine. A turbine rotor fixedly attached to a compressor rotor forms a body and the engine may comprise one or more bodies, usually two or three rotating at different speeds. Thus a double-bodied engine comprises a low pressure LP body and a high pressure HP body. In order to make it easier to mount the engine and reduce the mounting and removal times, its architecture is often divided into modules. For example, for the high pressure body of a double-bodied engine, all the parts forming the compressor are placed in an HP compressor module and all the parts forming the turbine rotor are placed in an HP turbine module.

The latter module consists only of the rotating parts, for example a turbine disk onto which a labyrinth seal assembly and a shell with an upstream assembly flange and a seal assembly associated with a downstream bearing are bolted.

DESCRIPTION OF THE PRIOR ART

Usually, the HP compressor and HP turbine modules are assembled by means of specific flanges; these flanges transmit the engine torque from the turbine to the compressor. The connection via these flanges must therefore be sufficiently strong to fulfill this function.

In addition, the modules must be supplied for assembly perfectly balanced in rotation. In the case of a module of the HP turbine type, an upstream balancing plane and a downstream balancing plane are provided. The balancing plane is the plane in which the balancing weights are placed at a determined distance from the axis and at a determined angle. In the solution with an assembly flange, the flange that is at the frontier of the module forms an appropriate balancing plane. The balancing weights are therefore placed in the zone of the frontier flange. This is particularly the case at the frontier between the HP compressor module and the HP turbine module. Each module is therefore presented for assembly balanced in this manner.

The use of specific assembly flanges is convenient but carries a weight penalty. An effort has therefore been made to develop a module whose assembly to the compressor can be achieved without a specific assembly flange. In particular, the possibility of achieving assembly to the compressor directly onto the turbine disk of the module has been examined.

The problem then arises of the turbine module being preassembled and delivered perfectly balanced. Specifically, it is important for the assembly engineers responsible for assembling the modules not to have to work on the module itself, otherwise the value of modularity would be diminished.

SUMMARY OF THE INVENTION

The Applicant has therefore set itself the objective of developing a turbine module that meets these requirements.

According to the invention, the turbine module for a gas turbine engine comprising at least one turbine disk and a disk-shaped component mounted upstream on the turbine disk relative to the gas flow, said module comprising a means of assembly between the compressor of said engine and the turbine disk, is characterized in that the component, before the module is assembled to the compressor, is preassembled to the turbine disk by bolting to an attachment flange fixedly attached to the turbine disk.

Thus, via the solution of the invention which consists in directly attaching the compressor module to the turbine disk and in connecting the component, placed between the compressor and the turbine disk, to the turbine disk separately, it is possible to reduce the weight without losing assembly security and a module preassembly that can where necessary be balanced.

Preferably, the means of assembling the compressor to the turbine disk comprises said attachment flange.

Particularly, when the component is disk-shaped with a wheel center between its hub and its periphery, and is mounted onto said flange by bolts through first drillings in the wheel center, second drillings are made in the wheel center for the assembly by bolts of the turbine module to the compressor.

According to another feature, the component is attached to said flange by bolts numbering between 2 and 8 distributed over the circumference.

Advantageously, the bolts are held by nuts swaged onto the flange, on the downstream side, together with nuts for assembling the module to the compressor. The bolts for attaching the component more particularly have a specifically shaped head which differs from the heads of the bolts for attaching the compressor.

According to another feature, the component comprises an upstream balancing device placed on said component independently of the means of assembly to the compressor.

The invention applies in particular to a module whose component is a disk supporting labyrinth seal elements.

The invention also covers the compressor associated with the module to form a gas turbine engine, comprising a downstream flange for attaching to the module. On this flange, housings or passageways are made for the heads of the attaching bolts already in place on the module.

BRIEF DESCRIPTION OF THE DRAWINGS

The invention will now be explained in greater detail in the following description of a nonlimiting embodiment with reference to the appended drawings in which.

DESCRIPTION OF THE PREFERRED EMBODIMENTS

Figure 1:
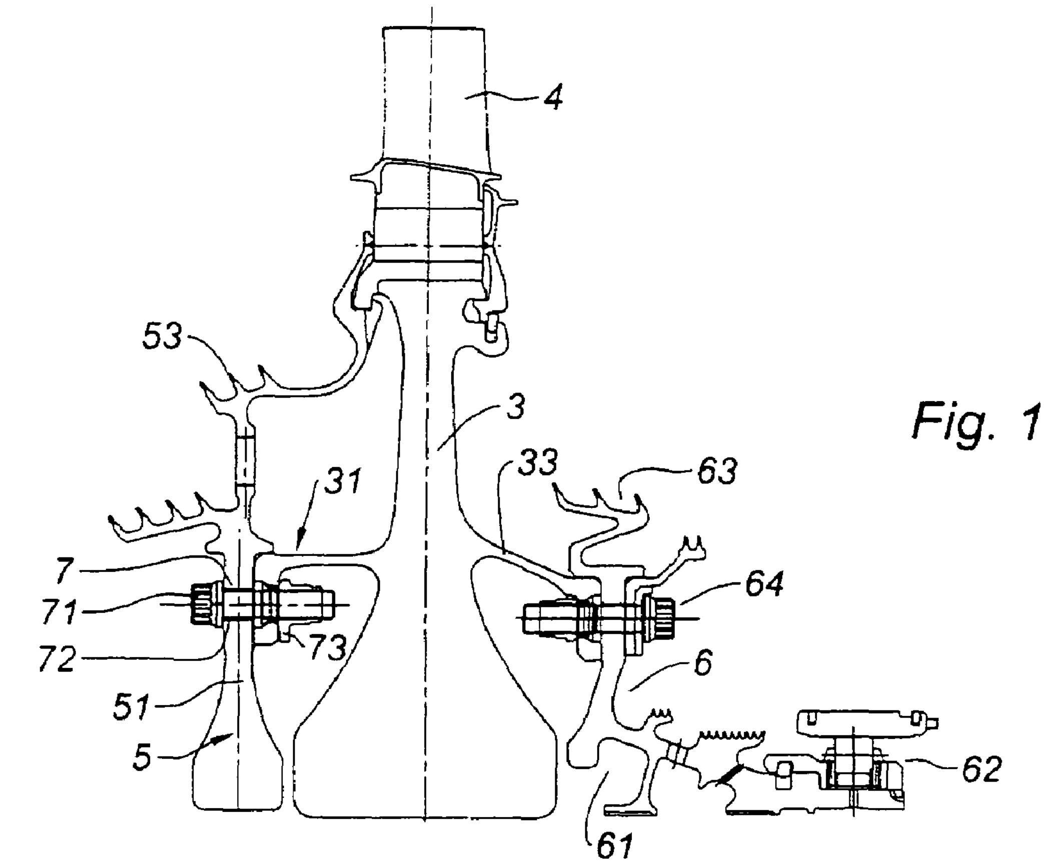
FIG. 1 shows, in axial section, a half-module of a high pressure turbine according to the invention.

FIG. 1 shows a half-module of an HP turbine in axial section. This module comprises a turbine disk 3, with a hub with an axial section with increasing thickness toward the shaft, and on the periphery of which the turbine blades 4 are mounted. The latter are housed in axial slots made on the rim of the disk. A component 5 is mounted on the disk 3 upstream, that is to say on the left in the figure. Upstream and downstream are defined relative to the flow of gases in the engine. The component here is a disk with symmetry of revolution relative to the axis of the machine. This disk comprises a hub with increasing thickness toward the shaft of the engine, a part forming a wheel center 51 going toward the periphery. The disk, at its periphery, supports radial annular blades 53 forming the rotating part of labyrinth seals. Their counterpart is not shown.

The disk 5 is attached to the disk 3 by bolting to an attachment flange 31 fixedly attached to the disk upstream of the latter. The bolts 7 comprise a head 71, a stem 72 passing through an orifice made in the wheel center 51 and a drilling machined in the flange 31, and interacting with a nut 73.

On the downstream side of the module, a disk 6 can be seen with a trunnion 61 forming a support for a downstream bearing 62. The disk is bolted to a downstream attachment flange 33. The attaching bolts 64 are distributed over the whole periphery of the disk. It also comprises sealing elements 63 for a labyrinth seal. The disk 6 forms a downstream balancing plane. Balancing weights are mounted with the attaching bolts.

The module as shown in FIG. 1 is preassembled ready for mounting and assembled to a compressor. The function of the bolts 7 is to hold the component 5 fixedly attached to the turbine disk during the operations. The bolts 7 are preferably four in number and are equidistant on the circumference. Their number may lie between 2 and 8. Account should be taken in fact of the bolts for attaching the compressor to the disk. The bolts 7 do not come to disrupt the blade spacing between the disk 3 and the disk 5.

Figure 2:
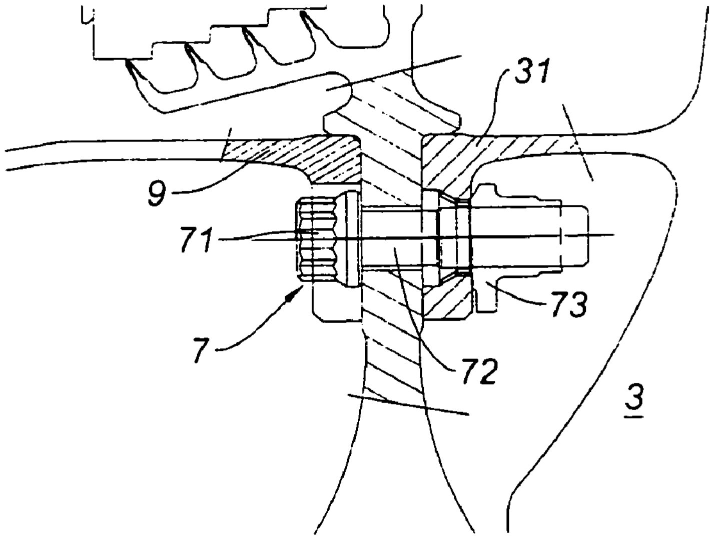
FIG. 2 shows the detail of the prior attachment of the component to the turbine disk, seen in axial section.
Figure 3:
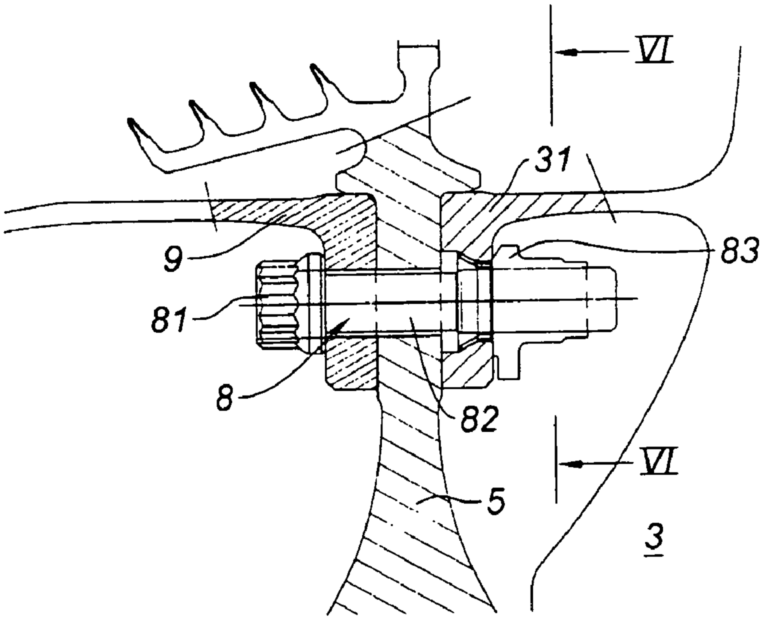
FIG. 3 shows the detail of the attachment of the downstream compressor flange to the turbine disk, seen in axial section.

FIGS. 2 and 3 show the bolting detail after the turbine module has been attached to an attachment flange 9 of the compressor. The latter is not shown. The attachment flange 9 is annular and forms the downstream frontier of the compressor. FIG. 2 shows a partial axial section made along a bolt 7 for attaching the component 5 to the disk 3. FIG. 3 shows a partial axial section made along a bolt 8 for attaching the flange 9 to the disk 3.

The heads 71 of the bolts 7 are engaged in wide lips of the flange 9 so that they come to engage directly with the disk of the component 5. These bolts therefore have no effect on the connection of the flange 9.

The bolts 8 of FIG. 3 each participate in attaching the flange 9 to the disk 3. The heads 81 are pressing against the upstream surface of the flange 9 that is held tight against the disk 5 by the nut 83 pressing against the downstream face of the flange 31. The stem 82 of the bolt 8 passes through the disk of the component 5 and the two flanges 9 and 31.

Figure 4:
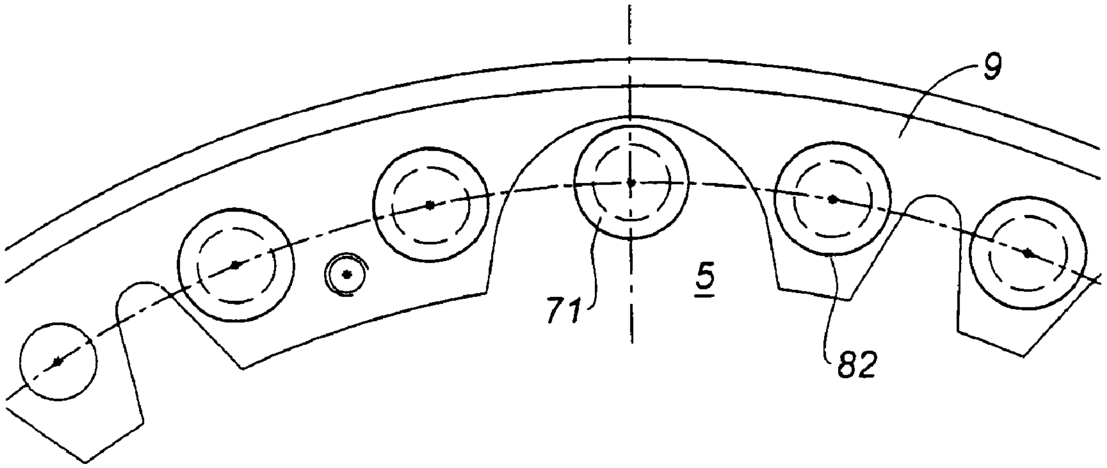
FIG. 4 shows in detail the arrangement of the HP compressor flange, seen from the upstream side.

FIG. 4 shows the annular flange 9, seen from the upstream side. It comprises scallop-shaped recesses to allow it to circumvent the heads 71 of the bolts 7 and come to press against the disk of the component 5. It also comprises drillings for the shanks 82 of the bolts 8 to pass through, whose head 81 presses on the edge of the drillings.

Figure 5:
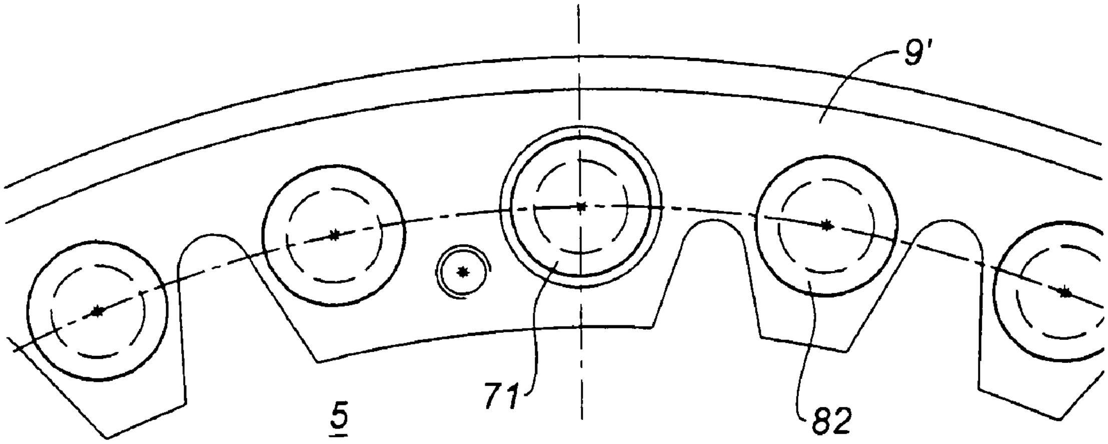
FIG. 5 shows a variant embodiment of the downstream HP compressor flange.

FIG. 5 shows a variant of an attachment flange 9' of the compressor. For the heads 71 of the bolts for attaching the disk 5 to pass through, instead of scallops, the passageway has been limited to a circular orifice with a diameter slightly greater than that of the heads 71.

The component 5 has the same drillings in the wheel center 51 capable of allowing either the bolts 7 or the bolts 8 to pass through.

To prevent confusion between the bolts 7 and 8, provision can be made for the heads 71 and 81 of the bolts to have different shapes.

For example, splined heads can be provided for some and broad heads (a broad head is a head broader than the tightening operation requires; it corresponds to that of a broader barrel) for the others or vice versa.

The use of this type of head, while also preventing confusion, also has the advantage of preventing the bolts 8 from seizing at the time of the modular dismantling of the compressor and the turbine. If the bolts 8 remain immovable, the specific heads 81 of the bolts 8 are capable of supporting a violent excess torque to shear the barrel 82 from the head 81. In any case, modular dismantling is achieved.

Figure 6:
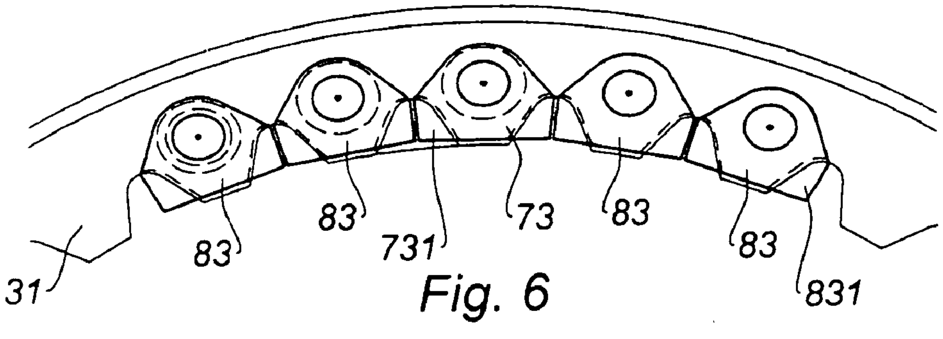
FIG. 6 is a section along VI-VI of FIG. 2 or 3 and shows the detail of the assembly of the nuts on the attachment flange fixedly attached to the turbine disk, seen from the downstream side.

FIG. 6 shows the flange 31 seen from the downstream side. The nuts 73 and 83 are preferably mounted and swaged in place before the parts are assembled. It should be noted that they have a tab 731 respectively 831 of rectangular shape in order to provide mutual locking in rotation. This makes it easier to tighten the bolts 7 and 8 during assembly. The nuts 73 and 83 swaged onto the flange 31 are identical.

The numbers of attaching bolts 8 and 7 are, in a concrete example, respectively 28 and 4. It has been verified that the 28 bolts can safely attach the compressor to the disk. The difference of 4 relative to an assembly of 32 has no effect. The calculations have thus demonstrated it particularly for the torquing, the mechanical stresses, the lifetime of the parts, etc.

Finally it is observed that this arrangement allows blade spacing between the compressor module and the turbine module.

Figure 7:
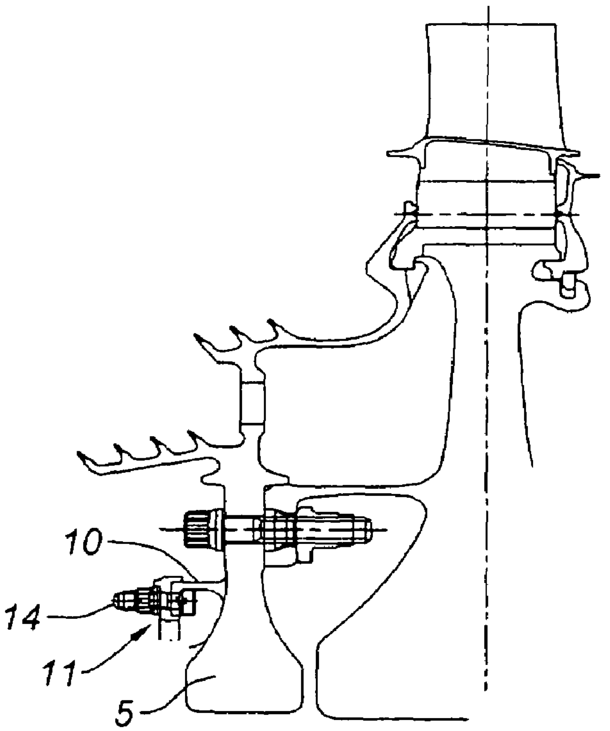
FIG. 7 shows a variant of the turbine module of FIG. 1, the module being fitted with an upstream balancing device.

In order to allow the balancing of the module, provision is made to place weights on the upstream face of the disk of the component 5 which then advantageously forms the upstream balancing plane. A module comprising this balancing device is shown in FIG. 7. The module comprises a flange 10 for coupling the weights to this face. The flange 10 is annular with a face perpendicular to the axis of the module, and comprises a plurality of machinings for the mounting of the weights. The number of machinings is preferably equal to that of the number of fins mounted on the turbine disk.

FIG. 7 shows a weight 11 in place held by bolts 111. In this case, installing these weights makes it possible to restore the upstream balancing plane of the HP turbine module rotor. This contributes to one of the conditions of delivery of a so-called clean module.

A module according to the present invention does not adversely affect the maintenance of the surrounding modules.

The invention claimed is:

1. A turbine module for a gas turbine engine comprising at least one turbine disk and a disk-shaped component mounted on the at least one turbine disk upstream relative to a gas flow, said module being configured to be assembled to a compressor of said engine, wherein the component is preassembled to the turbine disk, before the module is assembled to the compressor, by bolting to an attachment flange fixedly attached to the turbine disk, wherein bolts for attaching the disk-shaped component have a specific head which differs from the heads of bolts for attaching the compressor.

2. The module as claimed in claim 1, wherein said attachment flange is configured to assemble the module to said compressor.

3. The module as claimed in claim 2 wherein the disk-shaped component is disk-shaped with a wheel center between its hub and its periphery, and is mounted onto said attachment flange by a first plurality of bolts through a first plurality of orifices drilled in the wheel center, wherein a second plurality of orifices are made in the wheel center for the assembly by a second plurality of bolts of the turbine module to the compressor.

4. The module as claimed in claim 3, wherein the disk-shaped component has drillings in the wheel center corresponding to said first and second pluralities of orifices and capable of receiving said first plurality of bolts for fully preassembling said disk-shaped component to said turbine disk or the second plurality of bolts for assembling said module to said compressor.

5. The module as claimed in claim 3, wherein the first plurality of bolts for fully preassembling said disk-shaped component to said turbine disk are held by a first plurality of nuts swaged onto the attachment flange, on a downstream side, and wherein said second plurality of bolts are held by a second plurality of nuts for assembling the module to the compressor.

6. The module as claimed in claim 5, wherein the first plurality of nuts and the second plurality of nuts are identical.

7. The module as claimed in claim 1, wherein the disk-shaped component is fully preassembled to said flange by a first plurality of bolts numbering between 2 and 8 distributed over the circumference.

8. The module as claimed in claim 1, comprising an upstream balancing device placed on said disk-shaped component independently of the attachment flange.

9. A turbine module for a gas turbine engine comprising at least one turbine disk and a disk-shaped component mounted on the at least one turbine disk upstream relative to a gas flow, said module being configured to be assembled to a compressor of said engine, wherein the component is preassembled to the turbine disk, before the module is assembled to the compressor, by bolting to an attachment flange fixedly attached to the turbine disk, wherein the component is a disk supporting labyrinth seal elements.

10. A compressor associated with the module as claimed in claim 9 to form a gas turbine engine, comprising a downstream flange configured to attach to the module, said downstream flange defining housings made for heads of the first plurality of bolts already in place on the fully assembled module.

11. A gas engine comprising:

a turbine module for a gas turbine engine comprising at least one turbine disk and a disk-shaped component mounted on the at least one turbine disk upstream relative to a gas flow, said module being configured to be assembled to a compressor of said engine, wherein the disk-shaped component is preassembled to the turbine disk, before the module is assembled to the compressor, by bolting to an attachment flange fixedly attached to the turbine disk, wherein said attachment flange defines a first plurality of orifices that receive a first plurality of bolts to fully preassemble said disk-shaped component to said turbine disk, and wherein said attachment flange further defines a second plurality of orifices radially equidistant with said first plurality of orifices, wherein said second plurality of orifices are free of bolts when said disk-shaped component is fully preassembled to said turbine disk and when the module is not assembled to the compressor; and the compressor assembled to said module via a compressor flange, said compressor flange comprising drillings configured to receive a second plurality of bolts that pass through said second plurality of orifices in said attachment flange, wherein said compressor flange is configured to receive heads of said first plurality of bolts so that said heads of said first plurality of bolts directly press against said disk-shaped component of said module without contacting said compressor flange, wherein said compressor flange defines circular orifices having a diameter that is greater than said heads of said first plurality of bolts.

12. A gas engine according to claim 11, wherein heads of said second plurality of bolts directly press against said compressor flange without contacting said disk-shaped component of said module.

13. A gas engine according to claim 12, wherein each bolt of said first plurality of bolts is adjacent and between two consecutive bolts of said second plurality of bolts.

14. A gas engine according to claim 13, wherein said first plurality of bolts includes four bolts and said second plurality of bolts includes twenty-eight bolts.

15. A gas engine according to claim 13, wherein said first plurality of bolts plus said second plurality of bolts total no more than twenty-eight bolts.

* * * * *